(12) United States Patent
Das et al.

(10) Patent No.: US 7,564,852 B2
(45) Date of Patent: Jul. 21, 2009

(54) INTELLIGENT BANDWIDTH ALLOCATION FOR ETHERNET PASSIVE OPTICAL NETWORKS

(75) Inventors: Abhimanyu Das, Santa Clara, CA (US); Charles Chen, Santa Clara, CA (US)

(73) Assignee: Cortina Systems, Inc., Sunnyvale, CA (US)

( * ) Notice: Subject to any disclaimer, the term of this patent is extended or adjusted under 35 U.S.C. 154(b) by 695 days.

(21) Appl. No.: 11/161,017

(22) Filed: Jul. 20, 2005

(65) Prior Publication Data

US 2007/0041384 A1    Feb. 22, 2007

(51) Int. Cl.
H04L 12/28    (2006.01)
(52) U.S. Cl. .................... 370/395.41; 370/468
(58) Field of Classification Search ............... 370/230, 370/390, 395.2, 395.3, 395.4, 395.41, 412, 370/437, 442; 398/72
See application file for complete search history.

(56) References Cited

U.S. PATENT DOCUMENTS 5,375,074 A * 12/1994 Greenberg et al. ........... 703/17
7,085,281 B2 * 8/2006 Thomas et al. ............. 370/442
2004/0095884 A1 * 5/2004 Lee et al. .................... 370/235

* cited by examiner

Primary Examiner—Chirag G Shah
Assistant Examiner—Yong Zhou
(74) Attorney, Agent, or Firm—Brosemer, Kolefas & Associates

(57) ABSTRACT

A method and integrated hardware system for dynamic bandwidth allocation in EPONs which—in sharp contrast to the prior art—provides superior upstream transmission characteristics including QoS considerations consistent with any Service Level Agreement that exists between a customer and a service provider. Advantageously, our inventive method and system for dynamic bandwidth allocation provides fair and efficient upstream bandwidth management in addition to enhanced traffic performance for customer traffic within the EPON. For a service provider, our invention permits the deployment of intelligent traffic management and QoS characteristics capable of supporting existing or novel voice, video, and data services over the EPON.

12 Claims, 18 Drawing Sheets

Inputs:
Demand[i] : Queue Lengths (in units of 16ns time quanta) reported for each ONU in previous cycle, as received in MPCP REPORT messages.
MinSLA[i]: Bandwidth (in units of 16ns time quanta) per cycle, corresponding to the Minimum Bandwidth (CIR) parameter specified in an ONU's SLA.
MaxSLA[i]: Bandwidth (in units of 16ns time quanta) per cycle, corresponding to the Maximum Bandwidth (PIR) parameter specified in an ONU's SLA.
Weight[i]: Weight for an ONU, as specified in its SLA Profile, to be used in DBA allocation. These weights can typically be set to be the same as the MinSLA values.
EponBw: The EPON bandwidth(in quantums) available in a cycle after subtracting discovery window/register-ack overheads.
WorkConservingMode: Is set to true or false, depending on whether the DBA allocation is work-conserving or non-work conserving (where ONU grants cannot exceed their MaxSLA values)
CBRMode: Is set to true or false, depending on whether the DBA allocation is configured in the CBR mode (where every ONU always receives grants to support at least its MinSLA values)
MaxIter: Number of iterations for max-min fair estimation in the DBA algorithms
N: Number of Registered ONUs

Outputs:
StaticGrant[i]: The static transmission grant assignment (in units of 16ns time quanta) assigned to the ONU for the next cycle.
DynamicGrant[i]: The dynamic transmission grant assignment (in units of 16ns time quanta) assigned to the ONU for the next cycle.

FIG. 16(a)

```
DBA_Algorithm():
{
int sumdemand = 0;
int sumwt = 0;
int sumMinSLA = 0;
/* ExcessBw keeps track of the current excess bandwidth available
in the cycle to share among the ONUs. Initially it is set to
EponBw */
int ExcessBw = EponBw;

/* in non-work conserving mode of operation, first cap the ONU
demand values by their maxSLA values*/
if (WorkConservingMode=false)
{
   for i=1 to N
      Demand[i] = minimum(Demand[i],MaxSLA[i]);
}

/* in CBR mode of operation, first lower-bound the ONU demand
values
by their minSLA values*/
if  (CBRMode=true)
{
   for i=1 to N
      Demand[i] = maximum(Demand[i],MinSLA[i]);
}

/* if summation of MinSLA values is more than available cycle
bandwidth, skip static grant calculation and go to dynamic grant
calculation */
for i=0 to N
   sumMinSLA = sumMinSLA + MinSLA[i];

if  (sumMinSLA < ExcessBw)
/* first give every ONU up to its MINSLA share...this is the static
grant */
   for (int i=0;i<N;i++)
   {
       StaticGrant[i] = MIN(Demand[i],MinSLA[i]);
       ExcessBw = ExcessBw - Grant[i];
       Demand[i] = Demand[i]-Grant[i];
   }
```

FIG. 16(b)

```
/* this is the iterative procedure to divide the excess bandwidth
ExcessBw among the active ONUs in a weighted max-min fair
fashion..to get the dynamic grants for all ONUs */ for (int numiter=0; numiter<MaxIter; numiter++)
{
      sumwt = 0;
      for (int i=0;i<N;i++)
         if (Demand[i]>0) sumwt += weight[i];

for (int i=0;i<N;i++)
      {
         /* for every active ONU (ONU with unsatisfied demand),
check
         if its demand is lesser than its weighted fair share
         (weighted fair share = ExcessBw* weight(i)/sumwt); if
so,
         then give the ONU its full demand, and subtract this
amount
         from the ExcessBw) */ if (Demand[i] > 0) && (ExcessBw*weight[i]/sumwt >=
Demand[i])
         {
             DynamicGrant[i] = Demand[i];
             ExcessBw = ExcessBw - Demand[i];
             Demand[i] = 0;
         }
      }
}

/* Once the max number of iterations are over, just split the
remaining excess bandwidth(if any) to the remaining active ONUs
(if any) in a weighted fair manner*/ sumwt = 0;
for (int i=0;i<N;i++)
   if (Demand[i]>0) sumwt += weight[i];

for (int i=0;i<N;i++)
   if (Demand[i]>0)
      DynamicGrant[i] = Minimum
(Demand[i],(ExcessBw*weight[i]/sumwt));
                                }
```

FIG. 16(c)

INTELLIGENT BANDWIDTH ALLOCATION FOR ETHERNET PASSIVE OPTICAL NETWORKS

FIELD OF THE INVENTION

This invention relates generally to the field of packet-switched networks. More particularly, it relates to an intelligent method of dynamic bandwidth allocation for an Ethernet Passive Optical Network (EPON) and likewise to any TDM based multipoint-to-point network.

BACKGROUND OF THE INVENTION

The communications industry is on the cusp of a revolution characterized by three driving forces that will forever change the communications landscape. First, deregulation has opened the local loop to competition, launching a whole new class of carriers that are spending billions to build out their networks and develop innovative new services. Second, the rapid decline in the cost of fiber optics and Ethernet equipment has made them an attractive option for access loop deployment. Third, the Internet has precipitated robust demand for broadband services, leading to an explosive growth in Internet Protocol (IP) data traffic while, at the same time, putting enormous pressure on carriers to upgrade their existing networks.

These drivers are, in turn, promoting several key market trends. In particular, the deployment of fiber optics is extending from the telecommunications backbone to Wide-Area Network(s) (WAN) and Metropolitan-Area Network(s) (MAN) and the local-loop. Concurrently, Ethernet is expanding its pervasiveness from Local-Area Network(s) to the MAN and the WAN as an uncontested standard.

The confluence of these factors is leading to a fundamental paradigm shift in the communications industry, a shift that will ultimately lead to widespread adoption of a new optical IP Ethernet architecture that combines the best of fiber optic and Ethernet technologies. This architecture is poised to become the dominant means of delivering bundled data, video, and voice services on a single platform.

Passive Optical Networks (PONs) address the "last mile" of communications infrastructure between a Service Provider's Central Office (CO), Head End (HE), or Point of Presence (POP) and business or residential customer locations. Also known as the "access network" or "local loop", this last mile consists predominantly—in residential areas—of copper telephone wires or coaxial cable television (CATV) cables. In metropolitan areas—where there is a high concentration of business customers—the access network often includes high-capacity synchronous optical network (SONET) rings, optical T3 lines, and copper-based T1 lines.

Historically, only large enterprises can afford to pay the substantial costs associated with leasing T3 (45 Mbps) or optical carrier (OC)-3 (155 Mbps) connections. And while digital subscriber line (DSL) and coaxial cable television (CATV) technologies offer a more affordable interim solution for data, the are infirmed by their relatively limited bandwidth and reliability.

Yet even as access network improvements have remained at a relative bandwidth standstill, bandwidth has been increasing dramatically on long haul networks through the use of wavelength division multiplexing (WDM) and other technologies. Additionally, WDM technologies have penetrated metropolitan-area networks, thereby boosting their capacities dramatically. At the same time, enterprise local-area networks have moved from 10 Mbps to 100 Mbps, and soon many will utilize gigabit (1000 Mbps) Ethernet technologies. The end result is a gulf between the capacity of metro networks on one side, and end-user needs and networks on the other, with a last-mile "bottleneck" in between. Passive optical networks—and in particular EPONs—promise to break this last-mile bottleneck.

The economics of EPONs are compelling. Optical fiber is the most effective medium for transporting data, video, and voice traffic, and it offers a virtual unlimited bandwidth. But the cost of deploying fiber in a "point-to-point" arrangement from every customer location to a CO, installing active components at each endpoint, and managing the fiber connections within the CO is prohibitive. EPONs address these shortcomings of point-to-point fiber solutions by using a point-to-multipoint topology instead of point-to-point; eliminating active electronic components such as regenerators, amplifiers, and lasers from the outside plant; and by reducing the number of lasers needed at the CO.

Unlike point-to-point fiber-optic technology, which is typically optimized for metro and long haul applications, EPONs are designed to address the demands of the access network. And because they are simpler, more efficient, and less costly than alternative access solutions, EPONS finally make it cost effective for service providers to extend optical fiber into the last mile.

Accordingly, EPONs are being widely recognized as the access technology of choice for next-generation, high speed, low cost access network architectures. EPONs exhibit a shared, single fiber, point-to-multipoint passive optical topology while employing gigabit Ethernet protocol(s) to deliver up to 1 Gbps of packetized services that are well suited to carry voice, video and data traffic between a customer premises and a CO. Adding to its attractiveness, EPONs have been recently ratified by the Institute of Electrical and Electronics Engineers (IEEE) Ethernet-in-the-First Mile (EFM) task force in the IEEE 802.3ah specification.

With reference to FIG. 1, there is shown a typical EPON as part of overall network architecture 100. In particular, an EPON 110 is shown implemented as a "tree" topology between a service provider's CO 120 and customer premises 130[1] . . . 130[N], where a single trunk or "feeder" fiber 160 is split into a number of "distribution" fibers 170[1] . . . 170[N] through the effect of 1×N passive optical splitters 180.

As can be further observed with reference to this FIG. 1, the trunk fiber 160 is terminated at the CO 120 at Optical Line Terminator (OLT) device 190 and split into the number of distribution fibers 170[1] . . . 170[N] which are each either further split or terminated at an Optical Network Unit (ONU) 150[1] . . . 150[N] located at a respective customer premises 130[1] . . . 130[N]. As can be determined with reference to this FIG. 1, in the downstream direction (from the OLT to the ONUs) the EPON is a point-to-multipoint network, while in the upstream direction (from the ONUs to the OLT), the EPON is a multipoint-to-point network.

The process of sending data downstream from an OLT to an ONU on an EPON shared network topology is somewhat different from the process of sending data upstream from an ONU to the OLT. More specifically, in the downstream direction the EPON provides a broadcast medium which transmits every Ethernet frame (packets) simultaneously to all ONUs. Each individual ONU then extracts only the packets destined for it, and ignores others. Downstream bandwidth sharing among any traffic belonging to various ONUs is therefore simple and dictated by an egress scheduling policy implemented at the OLTs EPON interface.

In the upstream direction however, only one ONU can transmit to the OLT at a given time to prevent collisions, since the trunk fiber is shared by all of the individual ONUs. To allow sharing of the upstream bandwidth among the various ONUs, and to prevent collisions of packets originating from different ONUs, an EPON media access control protocol based upon time-division multiplexing has been developed and generally adopted by the IEEE 802.3ah Task Force. This protocol, named the Multipoint-to-Point Control Protocol (MPCP) allows the OLT to arbitrate between various ONUs requesting upstream transmission over the shared medium by assigning exclusive timeslots to individual ONUs. Accordingly, each ONU can transmit packets upstream only during its assigned timeslot(s).

In performing this arbitration, MPCP utilizes two Ethernet control messages namely, a GATE message and a REPORT message. The GATE message (sent by an OLT to an ONU) assigns a transmission timeslot window to the ONU. The GATE message specifies transmission start and end times during which the ONU can transmit queued, customer traffic upstream to the OLT. The REPORT message (sent by an ONU to the OLT) is used by an ONU to report bandwidth requirements for upstream transmission of its traffic. The REPORT message contains queue occupancy information, which can aid the OLT in allocating appropriate bandwidth to the ONU. A diagram depicting the relationships among the various components and protocols associated with upstream transmission in EPONs, is shown in FIG. 2.

Additionally, the GATE and REPORT messages also provide mechanisms for global time-synchronization between the OLT and ONUs, to ensure accurate, collision-free operation of the TDM-based bandwidth arbitration. According to the IEEE 802.3ah standard, MPCP timings are measured in time-quantum units of 16 nanoseconds, consequently, GATE transmission grants and REPORT queue lengths are specified in these 16 nanosecond time-quantum units.

MPCP therefore provides a mechanism for the OLT to arbitrate the upstream bandwidth by dynamically allocating non-overlapping transmission grants to the ONUs, based upon ONU report messages received, and an allocation policy configured at the OLT. However, since MPCP does not specify a particular policy which the OLT uses to allocate bandwidth among the ONUs, this policy choice is left to the specific OLT implementation. Such a dynamic bandwidth allocation policy, which provides the foundation upon which an OLT constructs and sends GATE messages to the ONUs, is appropriately named *Dynamic Bandwidth Allocation (DBA) Algorithm*.

These DBA algorithms or schemes must account for the potentially bursty nature of traffic and adapt to instantaneous ONU bandwidth requirements while performing statistical multiplexing. Their design and/or selection has a profound impact on the fairness, delay, jitter and other characteristics of upstream bandwidth allocation in an EPON.

As is known by those skilled in the art, DBA schemes employed by an OLT work in conjunction with the MPCP protocol to assign transmission grant schedules for active ONUs. In essence, the DBA is responsible for inter-ONU traffic scheduling over an upstream EPON channel.

DBA Design Criteria

A number of DBA schemes have been investigated and reported in the literature. Despite their differences however, each can be compared and evaluated according to a number of objective criteria. Designing and/or choosing an appropriate DBA for implementation within an OLT, requires a careful evaluation of each of these criteria.

Fairness/Efficiency in Bandwidth Allocation

Since DBA schemes dictate the policy for allocating transmission grant schedules to active ONUs, fairness in bandwidth allocation among various ONUs is a critically important property of the DBA. In particular, the DBA must fairly share the available bandwidth among contending ONUs based upon current demand and any Service Level Agreement (SLA) that exists between service customers served by a particular ONU and the service provider. In addition to fairness, the bandwidth allocation scheme must also exhibit high efficiency, such that the upstream link utilization is high, and transmission grants are not wasted. As is known, a potential source of wasted upstream bandwidth is frame delineation, wherein an ONU may not completely fill up allocated transmission grants due, in part, to the variably-sized Ethernet frames and infeasibility of frame fragmentation.

Work Conservation Property

Bandwidth allocation schemes may be either "work conserving" or "non-work conserving". Work conserving schemes provide that bandwidth is never wasted so long as at least one ONU has data to transmit. As such, an individual ONU may acquire as much bandwidth as it needs, provided that the bandwidth demands from all other ONUs on the EPON are met. In contrast, non-work conserving schemes do not permit an individual ONU to exceed, for example, a maximum bandwidth allocation as provided by a Service Level Agreement associated with that individual ONU. Consequently, an individual ONU that has reached its maximum bandwidth allocation as per its associated SLA, will not be granted more than that maximum amount—even if there exists free bandwidth. As a result, EPONs that utilize a non-work conserving scheme may have periods of time when no data is transmitted, even though individual ONUs (who have reached maximum allocation) have unfulfilled demands. Despite this apparent drawback, non-work conserving schemes may nevertheless be employed as they tend to reduce potential congestion in the core network while exhibiting tighter jitter bounds.

Delay and Jitter Bounds

Whatever specific DBA scheme is implemented, it should result in both small delay and delay-jitter bounds. This necessitates that an ONU containing queued packets waiting for transmission receives transmission grants from the OLT as quickly and as regularly as possible.

For applications involving real-time voice and video traffic, minimizing the packet transmission delay (defined as the time period between when a packet is queued up at an ONU to when it is subsequently transmitted to an OLT) is especially critical as it largely determines end-to-end application performance. In addition, a long packet transmission delay has the added detriment of requiring additional buffering at the ONU in the upstream direction to prevent dropped packets.

The delay-jitter bound refers to the variation in the delay(s) of packets as they travel over an EPON. For applications such as streaming video and voice, a small jitter bound is important as it minimizes a playout buffer needed at the destination and thereby ensures a smooth, uninterrupted voice/video playback.

Since a DBA scheme is implemented and run at the OLT, it does not have direct access to packet queue information, but instead relies on MPCP REPORT messages to provide this information, and MPCP GRANT messages to signal the start of packet transmission. The latency in sending REPORT and GRANT messages over the EPON introduces an additional delay and jitter factor for packets traversing upstream, since the DBA might not enable transmission of queued packets at an ONU until a round of REPORT and GRANT messages have been exchanged.

Implementation Complexity

A DBA scheme needs to be simple and fast enough to process REPORT messages and send out GRANT messages a quickly as possible in order to meet low-delay, real-time requirements. Consequently, the implementation complexity of a specific DBA scheme, coupled with its ability to scale to a large number of ONUs while still preserving its real-time capabilities, is of paramount concern.

DBA Classification

A number of DBA schemes have been proposed in the literature. (See, for example, M. P. McGarry, M. Maier, and M. Reisslein, "Ethernet PONs: A Survey of Dynamic Bandwidth Allocation (DBA) algorithms", IEEE Communications Magazine, 2004). These schemes may be broadly classified into three major groups, namely: Static SLA-Based Bandwidth Allocation; Demand-Based Bandwidth Allocation; and Demand+SLA-Based Bandwidth Allocation.

Static SLA-Based Bandwidth Allocation

Static SLA-based bandwidth allocation schemes are arguably the simplest of the bandwidth allocation schemes that can be implemented at the OLT. With these static SLA-based bandwidth allocation schemes, the transmission grant schedule generated by the DBA is fixed (based upon parameters such as the ONU SLA, etc), and repeated continuously to provide a TDM-like service to each of the ONUs. These schemes run in a cyclic fashion, with a fixed cycle length. Consequently, in every cycle, the DBA assigns a fixed transmission grant to each ONU—in a round-robin manner. The transmission grant schedule within a particular cycle is solely based upon static ONU parameters such as those defined by an SLA. Consequently, it does not take into account dynamic factors such as ONU demands carried in REPORT messages.

While these static SLA-based bandwidth allocation schemes—because of their TDM-like operation—provide low delay and jitter bounds for ONU traffic, they are primarily suited to constant-bit-rate traffic, since they cannot provide statistical multiplexing of the traffic. When ONU traffic patterns are bursty an dynamic, static SLA-based bandwidth allocation schemes lead to low bandwidth utilization and general unfairness.

Demand-Based Bandwidth Allocation

Demand-based bandwidth allocation schemes are characterized by their consideration of demands from ONUs while allocating bandwidth, but not any ONU specific service level agreement. (See, for example, G. Kramer, B. Mukherjee, and G. Pesavento, "IPACT: A Dynamic Protocol for an Ethernet PON", IEEE Communications Magazine, February 2002; and H. Miyoshi, T. Inoue, and K. Yanashita, "D-CRED:Efficient Dynamic Bandwidth Allocation Algorithm in Ethernet Passive Optical Networks", Journal of Optical Networking, August 2002) Such demand-based bandwidth allocation schemes are typically polling-based. As such, the OLT polls each ONU in a round-robin manner and—based on the queue lengths in the received REPORT message(s)—issues transmission grants to ONUs as required.

Additionally, the cycle length for each round-robin iteration is not fixed when a demand-based bandwidth allocation scheme is employed rather it varies depending upon ONU demands in the previous iteration. Consequently, these demand-based bandwidth allocation schemes achieve high bandwidth utilization but cannot provide SLA-based fairness or service differentiation among ONUs, nor can they provide low delay and jitter bounds due to the variable cycle-lengths involved.

Demand+SLA-Based Bandwidth Allocation

Demand+SLA-based bandwidth allocation schemes such as those described by M. Ma, Y. Zhu and T. Cheng in a paper entitled "A Bandwidth Guaranteed Polling MAC Protocol for Ethernet Passive Optical Networks", which was presented at IEEE INFOCOM, 2003; and another entitled "Dynamic Bandwidth Allocation For Quality-Of-Service Over Ethernet PONs", which was authored by C. Assi, Y. Ye, S. Dixit, and M. Ali and appeared in IEEE Journal on Selected Areas in Communciations, in November 2003, take into account both ONU SLAs and ONU demands (as reported in their REPORT messages) while creating transmission grant schedules. In each cycle—according to these Demand+SLA-based bandwidth allocation schemes—the transmission grant schedule is created from the most recent REPORT message(s) received by registered ONUs and any configured SLA parameters for these ONUs, using an appropriate fairness model (such as max-min fairness or proportional fairness).

In addition, certain DBA schemes can be further categorized based upon whether they handle intra-ONU scheduling in addition to inter-ONU scheduling. Up until this point, most DBA schemes consider inter-ONU scheduling only, that is, determining which ONU should transmit traffic at a particular time.

However, Quality-Of-Service (QOS) considerations typically require that individual ONUs queue traffic into multiple priority queues—one for each class of service supported. How an individual ONU selects packets from among its multiple priority queues for transmission within its assigned grant window is typically determined locally by the individual ONU. This local, priority queue selection determination is generally referred to as intra-ONU scheduling.

Accordingly, some DBA schemes have been proposed that consider both intra-ONU and inter-ONU scheduling. These "hybrid" schemes, such as that described by G. Kramer, B. Mukherjee, S. Dixit, Y. Ye, and R. Hirth in a paper entitled "Supporting Differentiated Classes of Service in Ethernet Passive Optical Networks", which appeared in Journal of Optical Networking, in August 2002, operate by inspecting separately reported queue lengths contained in MPCP REPORT messages sent from an ONU to the OLT. The DBA is therefore able to determine separate bandwidth demands for each QoS supported within an individual ONU. If necessary, the DBA can allocate multiple transmission grants per ONU in a given cycle—one for each of its (the ONUs) priority queues, in contrast to issuing a single transmission grant to the ONU and letting the ONU schedule its priority queues locally.

While such hybrid schemes do advantageously provide intra-ONU and inter-ONU scheduling under the control of a single, centralized scheme while simultaneously enabling fine-grained QoS service differentiation, they nevertheless suffer from an inability to scale, and are prohibitively complex. In addition, these prior art hybrid schemes are not well supported by standards-based protocols, i.e., MPCP GATE protocols, and therefore are unsuitable for widespread adopotion.

Consequently methods and apparatus that improve the upstream transmission characteristics of an EPON—and in particular those incorporating and satisfying the DBA design criteria described previously—would represent a significant advance in the art. Such a method and apparatus is the subject of the present invention.

SUMMARY OF THE INVENTION

In recognition of this deficiency in the Art, we have invented a method and integrated hardware system for dynamic bandwidth allocation in EPONs which—in sharp contrast to the prior art—provides superior upstream transmission characteristics including QoS considerations consistent with any Service Level Agreement that exists between a customer and a service provider.

Advantageously, our inventive method and system for dynamic bandwidth allocation provides fair and efficient upstream bandwidth management in addition to enhanced traffic performance for customer traffic within the EPON. For a service provider, our invention permits the deployment of intelligent traffic management and QoS characteristics capable of supporting existing or novel voice, video, and data services over the EPON.

Further features and advantages of our invention will become apparent with reference to the accompanying drawing and illustrative detailed description.

DESCRIPTION OF THE DRAWING

FIGS. 16(a), (b), and (c) are representative pseudocode listings of our inventive method(s).

DETAILED DESCRIPTION

Figure 1:
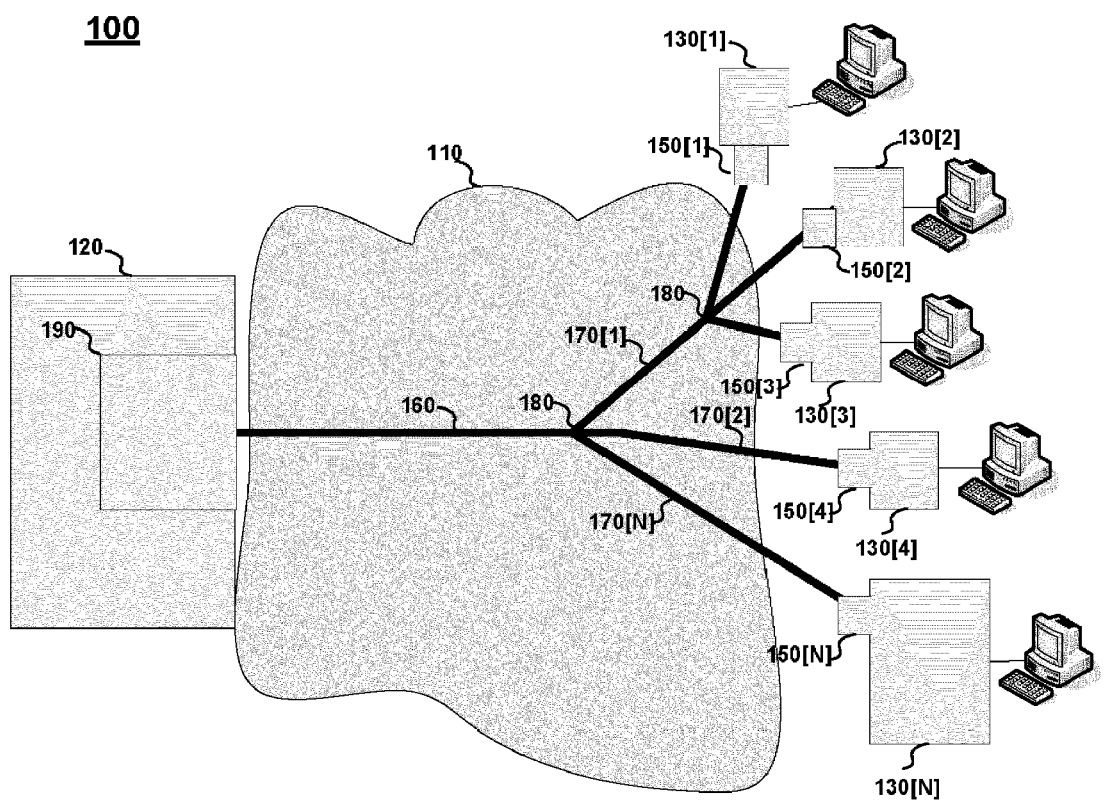
FIG. 1 is a block diagram of a representative Ethernet Passive Optical Network showing both customer premises and central office aspects.
Figure 2:
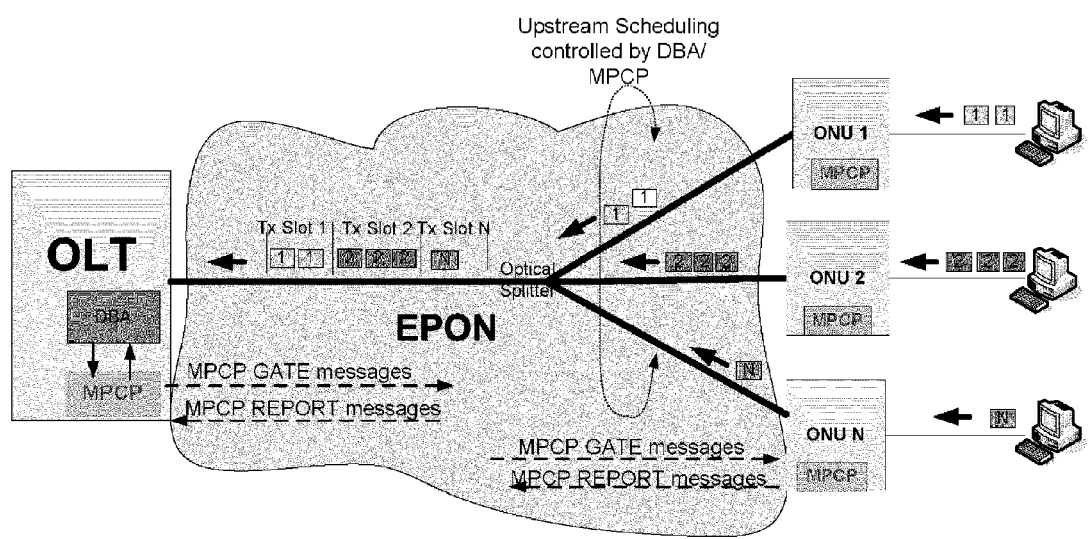
FIG. 2 is a block diagram depicting upstream transmission in an EPON.
Figure 3:
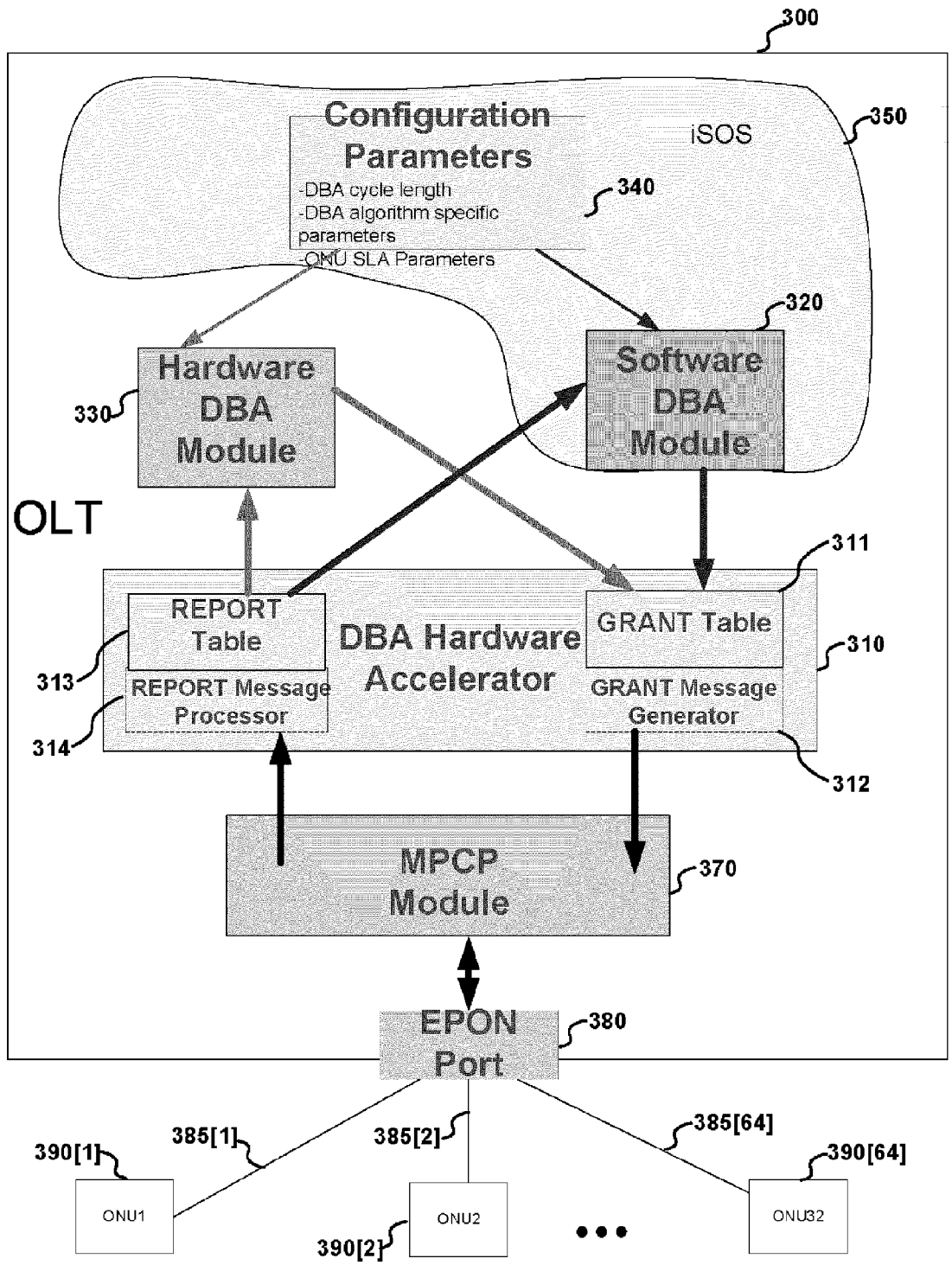
FIG. 3 is a block diagram depicting our inventive hardware/software architecture for OLT device.

Illustrative examples of our invention will now be presented with further reference to the attached drawing. With reference now to FIG. 3, there is shown a block diagram of our inventive DBA implementation 300 of an OLT device. As presently embodied, our implementation 300 of the OLT is a combination of a highly-integrated chipset and associated software.

Accordingly, our implementation includes our inventive intelligent DBA algorithms (not specifically shown) which interact with an efficient MPCP module 370 to efficiently control upstream bandwidth allocation among registered ONUs in the EPON. As presently embodied, our chipset can support the dynamic bandwidth allocation among up to 64 ONUs (390[1] . . . 390[64]) per EPON port 380, for a total of 256 ONUs across four EPON ports of the current device. Importantly, our device is not specifically limited to only four EPON ports, and a number of supported ONUs in excess of the current 256 is both anticipated and expected.

In meeting the diverse QoS and traffic management requirements of a wide variety of EPON service providers, our inventive device and architecture provides both hardware DBA module(s) 330 and software DBA module(s) 320 to ensure fair SLA-based bandwidth allocation, along with high bandwidth utilization in conjunction with low delay and jitter.

Advantageously, and to achieve enhanced QoS performance and reduced delay and jitter bounds of upstream traffic, our inventive DBA algorithms employed are cycle-based, with a configurable cycle time. As we will discuss later, the DBA algorithms implemented in hardware DBA module 330 and software DBA module 320 exhibit similar structure(s), and conform to a sophisticated fairness criteria. Inasmuch as it is desirable to have the hardware DBA module 330 run at significantly higher speeds than the software DBA module 320, the algorithms implemented within the hardware DBA module 330 may be a somewhat simplified variation of those implemented within the software DBA module 320.

A result of this inventive "hardware-software duality" is that our hardware DBA module 330 is able to run at significantly higher speeds while supporting cycle times as small as 0.4 ms thereby providing extremely low delay and jitter bounds. The software DBA module 320, on the other hand, exhibits superior configurability and features, while simultaneously permitting future changes and/or modifications to its specific DBA algorithm, without requiring a corresponding hardware change or modification.

Continuing with our discussion of FIG. 3, both the hardware DBA module 330 and the software DBA module 320 utilize a dedicated, hardware-driven DBA accelerator module 310 that, among other things, serves as an interface between the DBA modules (320, 330) and an MPCP module 370, as well as providing the fast generation and processing of MPCP GATE and REPORT messages.

A software framework for overall DBA management and control, and for the software DBA implementation within the software DBA module 320 described previously, is our iSOS operating system 350. This operating system 350 provides for input and maintenance of a number of configuration parameters 340 that are necessary for effective DBA implementation, including DBA cycle length, DBA algorithm specific parameters, and ONU SLA parameters, etc.

In a preferred embodiment, the hardware DBA module 330 uses a highly optimized, Application Specific Integrated Circuit (ASIC) to implement its internal DBA algorithm. Conversely, the software DBA module 320 may make use of any of a variety of microprocessors, such as the ARM 946.

Each of the DBA modules (hardware 330 and software 320) receives four inputs and produces one output. The four inputs are: 1) ONU SLA Configuration Information; 2) DBA Configuration Parameters; 3) ONU Registration Information; and 4) Report Table. The output is information required to construct a Grant Table 311, which is subsequently utilized by the DBA hardware accelerator, 310.

The ONU SLA Configuration Information is configured by a system vendor using iSOS 350. Elements comprising ONU SLA configuration information include: Peak Information Rate (PIR), Committed Information Rate (CIR), Maximum Burst Size, Maximum Delay, Maximum Jitter.

DBA Configuration Parameters are also configured by a system vendor using iSOS 350. These DBA configuration parameters include: cycle length, grant scheduling mode, work conserving mode, and discovery/registration window size, among others.

ONU Registration Information is maintained by an ONU registration module (not specifically shown), which in turn works with the MPCP module 370 to register/deregister ONUs within the EPON. As can be appreciated, the DBA algorithm(s) requires knowledge of the number of active ONUs registered at a given time in order to provide effective sharing of the upstream EPON bandwidth.

A Report Table, 313, maintained by the DBA hardware accelerator 310, contains ONU queue lengths conveyed in recent REPORT messages received from the registered ONUs comprising the EPON. The Report Table 313 is used by the DBA algorithms as an indication of the bandwidth demands of the ONUs. In a preferred embodiment, the DBA Accelerator module 310 receives—from the MPCP module 370, incoming ONU REPORT messages during each cycle and writing queue length information into the Report Table 313. At the beginning of each cycle iteration, the hardware and software DBA module(s) read this information contained within the Report Table 313 which is subsequently used as input to the DBA module(s) algorithmic execution for that cycle.

The output of our inventive algorithm includes grant length assignments for each registered ONU. To ensure low delay and jitter, grant lengths are divided into a static grant part and a dynamic grant part, which are specified separately, as we shall now explain.

Cycle Based Operation

Our inventive DBA architecture is based on an iterative, fixed-cycle paradigm. The DBA algorithm runs repeatedly over a fixed cycle length. For each cycle, the DBA dynamically creates a transmission grant schedule, by fairly and efficiently dividing the total cycle time among grants to be assigned to various ONUs in that cycle. Advantageously, the DBA cycle length may vary from as little as 0.4 ms to as much as 10 ms. Similarly, the DBA software mode may experience a cycle length as small as 1.0 ms.

While a small cycle length generally minimizes delay and jitter bounds, it can also adversely affect the upstream channel utilization due, in part, to overhead involved in processing MPCP messages and any laser on/off times. Advantageously, and in contrast to the prior art, we provide with our inventive DBA architecture a wide range of configurable cycle-lengths for operation, thereby ensuring both flexible and customizable QoS service performance for upstream traffic.

It is important to note that the stated cycle length includes the time for ONU Discovery and Registration windows, which is pre-configured (in terms of the frequency and length of Discover/Register window length) at a global level. Therefore, the effective time available for bandwidth allocation in each cycle is smaller than the total configured cycle length.

To ensure low delay and fair bandwidth allocation, our DBA framework ensures that REPORT messages are received from every active ONU in each cycle. As we will later explain, this is made possible by our DBA algorithms ensuring that—in every cycle—each registered ONU gets a minimum transmission grant necessary to send a REPORT message. Of course, REPORT messages may be "piggybacked" with any actual data transmission taking place within a particular ONU grant.

Figure 4:
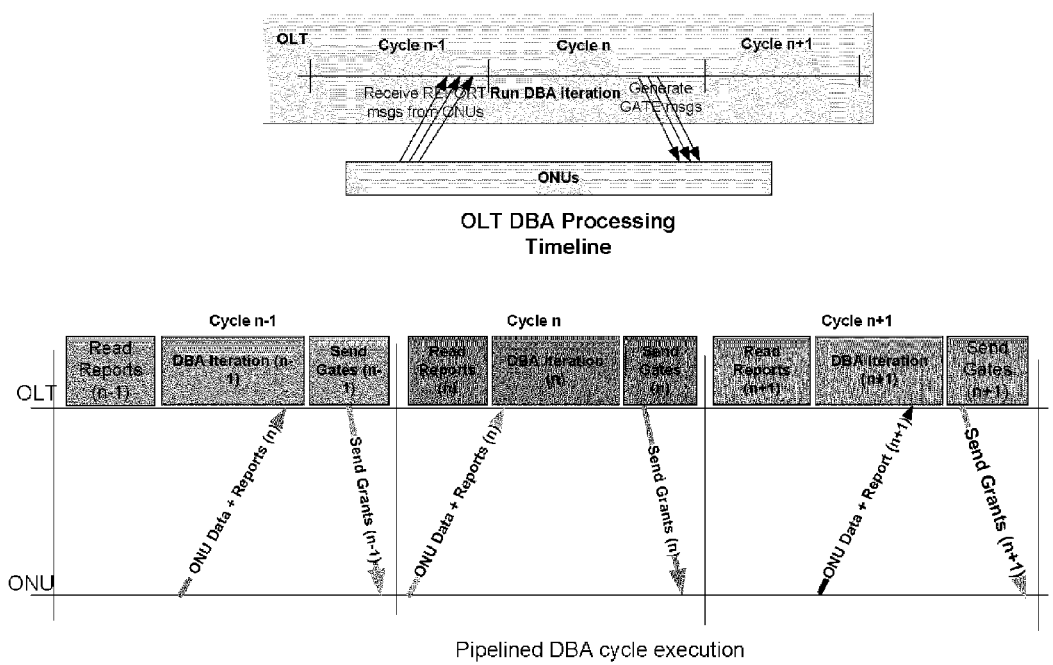
FIG. 4 is a timing diagram depicting cycle-based DBA operation and in particular an OLT DBA processing timeline and a pipelined DBA cycle execution timeline.

With reference now to FIG. 4 and in particular the timeline depicting OLT DBA processing timeline, there it may be observed that the DBA reads REPORT information from a previous cycle (Cycle n−1) and calculates a transmission schedule for GATE generation, to be used for bandwidth allocation among ONUs in the next cycle (Cycle n+1). This cyclic behavior is pipelined for efficiency purposes as shown. Note further that the DBA pipeline is shown only for a single ONU. In an actual implementation the number of pipelines will depend upon the number of ONUs present in the EPON.

As noted before, REPORT messages from ONUs are piggybacked along with their data transmission(s). As can be appreciated from this discussion, in every cycle, a DBA algorithm iteration is executed using the previous cycle REPORT message(s) thereby producing GATE messages for the next cycle, while the REPORT messages for the current cycle are being stored for the next DBA iteration.

Interaction(s) with Local ONU Scheduling

As mentioned before, MPCP REPORT messages may report individual ONU priority queues separately, instead of as a single, aggregate value. As such, if an OLT were provided with this status of individual ONU priority queues, it may determine intra-ONU scheduling within its DBA algorithm.

Unfortunately however, SLAs for most network operators contain aggregate traffic profiles that can be guaranteed only if DBA algorithms are agnostic to various internal priority queuing mechanisms within different ONUs. In addition, complete DBA-based intra-ONU scheduling is not standards-compliant and scalability and fairness problems arise with such intra-ONU scheduling attempts.

Figure 5:
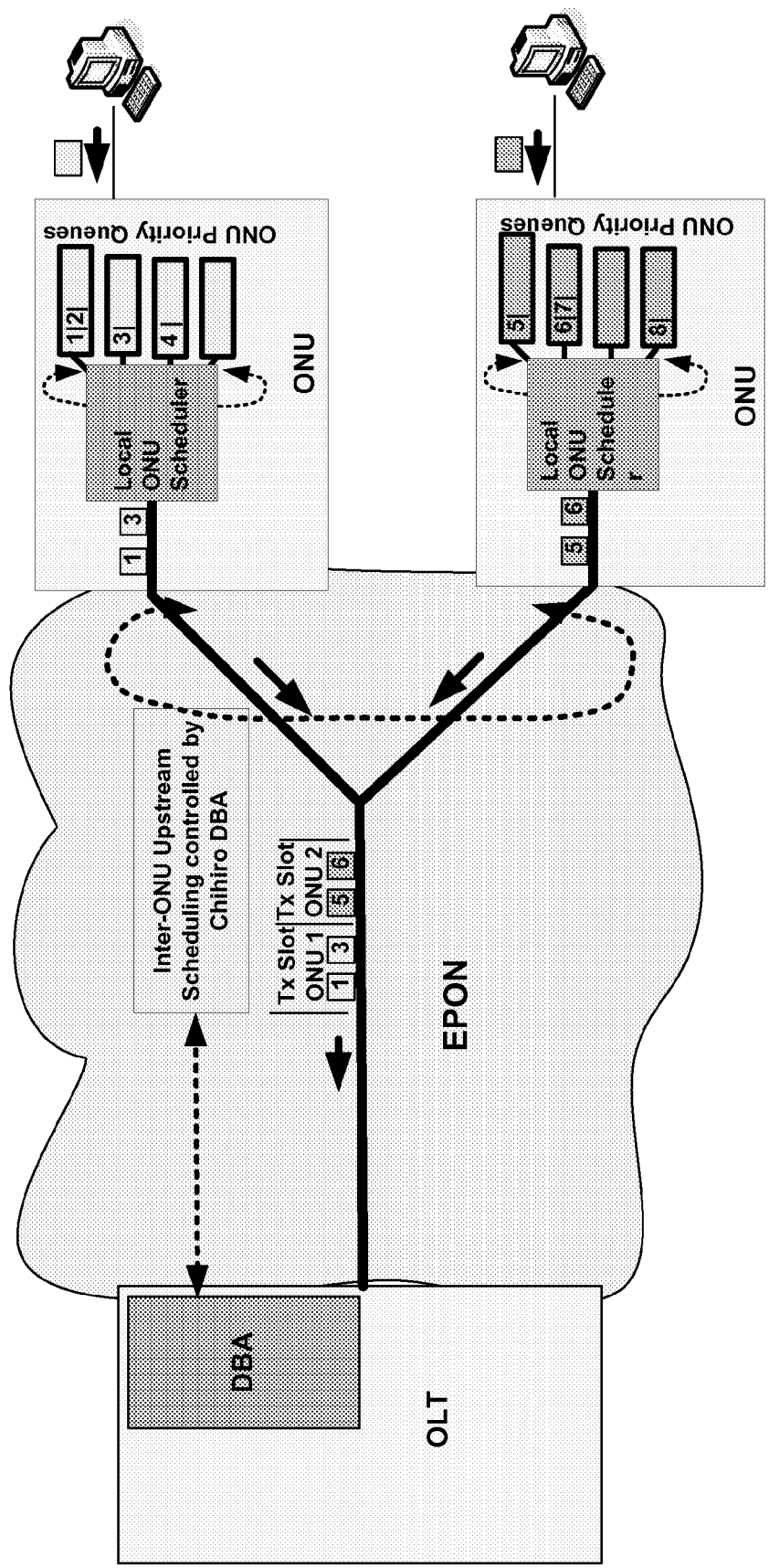
FIG. 5 is a block diagram depicting an interaction of DBA with local ONU schedulers, according to the present invention.

Accordingly, in order to achieve maximum scalability, fairness and standards-compliance in DBA operation, our inventive architecture only involves inter-ONU scheduling and permits individual ONUs to perform intra-ONU scheduling locally. Turning our attention now to FIG. 5, there is shown as a block diagram, the interaction of DBA with local ONU schedulers. As can be seen from FIG. 5, OLT DBA schedules inter-ONU upstream scheduling while each of the ONUs—which includes their own local ONU scheduler—schedule its local ONU priority queues. As such, each of the ONUs employed may contain their own local sophisticated egress queue-scheduling algorithm(s).

DBA Algorithm Design

As we will now discuss, our DBA algorithm conforms to well-established fairness criteria while providing low-delay and jitter-services and maximizing bandwidth utilization. The algorithm—advantageously—makes use of the highly proven and well tested (in both practice and theory) concept of max-min fairness—as that term is used in computer networking.

As noted before, our inventive software DBA module advantageously implements the full DBA algorithm along with all of its features and configuration modes while the hardware DBA algorithm implements a somewhat simplified version of that full DBA algorithm that is optimized for higher speeds. In the preferred embodiment outlined here, our full DBA algorithm exhibits the following characteristics: 1) Allows dynamic bandwidth allocation among a maximum of 256 ONUs per OLT device (chip); 2) Supports both SLA and Demand-based fairness—conforms to max-min fairness criteria; 3) Provides low delay and jitter bounds for upstream voice and video customer traffic; 4) Allows for variable DBA cycle lengths between 1 ms and 10 ms, customizable by software Applications Programming Interface (API); 5) Supports ONU prioritization in bandwidth allocation based upon user-configurable weights; 6) Configurable for both work-conserving and non-work-conserving bandwidth allocation; and 7) Robust and efficient hardware/software design using ARM9 microprocessor and customized ASICs.

Max-Min Fairness Strategy

Our inventive DBA algorithm is loosely based on the principle of weighted max-min fairness. As can be readily appreciated by those skilled in the art, max-min fairness is a fair resource allocation strategy characterized by dividing up a resource among multiple entities that are competing with one another for that resource and wherein each of the competing entities has its own demand. This strategy tries to maximize the bandwidth assigned to the entity receiving the smallest share, while ensuring that no entity gets more than its demand and entities with unfulfilled demands share any remaining bandwidth equally.

Weighted max-min fairness extends the max-min fairness strategy described above by assigning weights to each of the competing entities. As such, when using a weighted max-min fairness strategy, bandwidth is allocated to entities in order of increasing demand, normalized by weight, such that no entity receives more than its demand and excess bandwidth is shared among entities with unsatisfied demands, in proportion to their weight(s).

In analyzing EPON DBA scenarios for the purpose of employing a weighted max-min fairness strategy, we recognize that the bandwidth corresponds to the upstream EPON channel bandwidth, the entities correspond to the ONUs and the demands correspond to the queue lengths as specified by ONUs in their REPORT messages.

As can now be appreciated, apart from individual ONU weights, the max-min strategy does not incorporate ONU SLA profiles (which indicate a minimum guaranteed bandwidth and a maximum allocable bandwidth) during bandwidth allocation. Accordingly, and in order to preserve fairness of EPON bandwidth allocation, our inventive DBA algorithm modifies the weighted max-min strategy such that it is SLA-aware, as we shall describe.

Algorithm Description

We now turn to a description of our inventive algorithm. As mentioned previously, our algorithm is cycle-based. Accordingly, in each DBA cycle, the algorithm operates by dividing up the available bandwidth (corresponding to the configured cycle time, minus any overhead associated with discovery/register-ack slots) among the various registered ONUs. For each cycle iteration, the algorithm uses as input, the bandwidth demands from ONUs in REPORT messages received during the previous cycle, and the min-SLA bandwidth, max-SLA bandwidth, and weight values from the SLAs of registered ONUs. Consistent with MPCP standards, all bandwidth and demand values are converted and specified in units of 16 ns time quantum.

Weight Determination: As can be readily appreciated, an important component of an ONU's SLA profile is its weight assignment, which is used by our inventive DBA algorithm (in addition to its maximum and minimum SLA parameters) for fair bandwidth allocation. As described previously, in every iteration of the dynamic grant assignment phase of the DBA algorithm, excess bandwidth (bandwidth available in a DBA cycle, after all ONUs have been offered their min-SLA values) is divided up among contending ONUs in proportion to their weights using a weighted max-min fair policy. The weight assignments thus allow for a relative prioritization among ONUs, when offering excess bandwidth to contending ONUs.

Weights for ONUs can be either manually assigned by a network operator by explicitly specifying weight values during SLA configuration at the OLT, or can be automatically assigned by the DBA algorithm based on the other ONU SLA parameters or on dynamic ONU traffic histories. For automatic assignment of weights to ONU by the DBA algorithm, several configurable options are provided in our inventive implementation(s):

Weights proportional to Minimum SLA Bandwidth: By default, the ONU weight is assigned to be equal to its Minimum-Bandwidth value specified in its SLA configuration. This implies that the DBA's max-min fairness strategy offers excess bandwidth to contending ONUs in proportion to their minimum-bandwidth values. ONUs with larger minimum-bandwidth values will therefore be allowed to receive larger dynamic grant windows (and hence, a larger share of upstream bandwidth) compared to ONUs with smaller minimum-bandwidth values.

Weights proportional to Average SLA Bandwidth: The ONU weights can also be automatically assigned to be equal to the average of its Minimum SLA-bandwidth and Maximum SLA-bandwidth, as specified in their SLA configurations.

Dynamic weight assignment based on traffic history: Another option allows the DBA algorithm to dynamically assign ONU weights based on a function of the average ONU demands in the past few DBA cycles. One of the functions provided allows the weight of an ONU to be inversely proportional to the amount of upstream traffic generated by the ONU in recent cycles. This might advantageously be used, for example, to impose an additional level of fairness in bandwidth allocation among ONUs with otherwise identical SLA-profiles.

As can be readily understood and appreciated, by allowing for a range of configurable weight assignment strategies, our inventive DBA algorithm provides network operators with a high degree of flexibility in fine-tuning the DBA to conform to their desired fairness and ONU service-differentiation requirements.

The output of our inventive algorithm includes grant length assignments for each registered ONU. To ensure low delay and jitter, grant lengths are divided into a static grant part and a dynamic grant part, which are specified separately, as we shall now explain.

Figure 6:
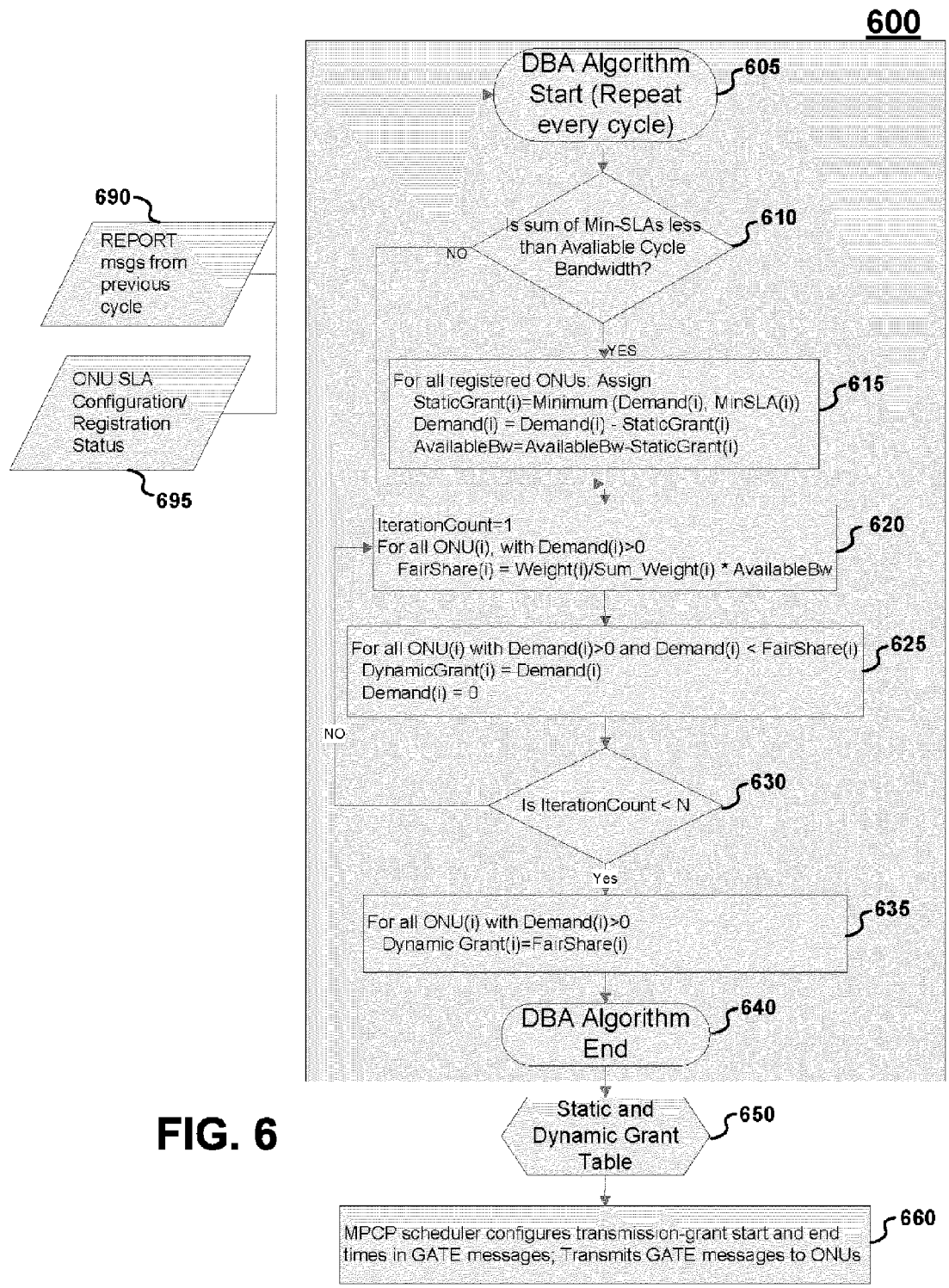
FIG. 6 is a flowchart depicting our inventive DBA algorithm according to the present invention.

Turning now to FIG. 6, there is shown a flowchart 600 depicting our inventive algorithm. In particular, the algorithm begins (or repeats every cycle) at block 605 with information contained in REPORT messages from previous cycle 690 and a set of ONU SLA configuration/registration status information 695, and makes an initial determination at block 610 whether the sum of Min-SLAs is less than the available cycle bandwidth. Note that this determination of block 610 is for the EPON available upstream bandwidth.

If the determination of block 610 is "YES" and the sum of MIN-SLAs is less than the available EPON upstream bandwidth, then a static grant assignment is made at block 615 in which grants equal to an ONUs min-SLA value (not exceeding its demand) is made. This process of block 615 is repeated for all registered ONUs and ensures that at least the min-SLA value for every registered ONU is guaranteed.

Additional "bookkeeping" is performed in block 615 including decrementing the demand for each of the ONUs by an amount equal to the static grant made for that ONU followed by decrementing the amount of available bandwidth by an amount equal to the static grant for that ONU as well.

Continuing with block 620, our inventive algorithm divides the remaining bandwidth available in the cycle fairly among ONUs with unsatisfied demands in a weighted max-min fair operation, to produce dynamic grants for the ONUs. The dynamic grant assignments are made iteratively by blocks 620, 625, and 630 and, in every iteration, evaluates all remaining active ONUs (ONUs with unsatisfied demands) and calculates for each such ONU, its weighted fair share of the currently available bandwidth. For all ONUs whose remaining demands are less than their weighted fair share values, our method allocates them their full demands (within the dynamic grant), removes them from consideration for future iterations, and then repeats the iteration.

After all of the ONUs have been considered at block 630, each of the ONUs having a demand are provided a dynamic grant equal to its calculated fair share (block 635 makes a fair share assignment for each of the ONUs. Advantageously, the dynamic grant(s) assigned is a weighted max-min fair allocation of the excess bandwidth.

Once all of the grant lengths have been determined and assignment(s) made, static and dynamic grant table(s) and transmission grant schedule(s) are then created for a next cycle in block 650. These grant schedules include grant start times, and grant lengths, which are then incorporated into GATE messages by MPCP modules (block 660).

Importantly, but not specifically shown in the flowchart of FIG. 6, our inventive algorithm limits the maximum number of iterations run for max-min fairness estimation to a fixed value of 5, independent of the number of active ONUs. Advantageously, this speeds up DBA time complexity and supports small cycle lengths, while resulting in very minor variation from an optimal max-min fairness rate.

Static/Dynamic Grant Scheduling Mode

Since our inventive DBA algorithm is dynamic in nature and uses recently-received ONU demands as an input, the total transmission grants allocated by the DBA to a particular ONU can vary from cycle to cycle. As can be appreciated, this variation in transmission grant lengths per cycle can contribute to increased burstiness and delay-jitter in upstream customer traffic transmission. To reduce this burstiness, our inventive algorithm provides an option of splitting up ONU transmission grants into two parts—a fixed part (static grant) and a variable part (dynamic grant).

The transmission grants allocated to an ONU includes a static grant portion and a dynamic grant portion. The static grant is set to the minimum SLA bandwidth for an ONU in each cycle, as long as that ONUs demand is more than that minimum SLA rate. Conversely, if the demand of a particular ONU is less than the minimum SLA, then the static grant is set to this lesser value of the demand. The dynamic grant is equal to the excess bandwidth allocated to the ONU based on max-min fair sharing with other ONUs and can vary significantly from cycle to cycle, depending upon the ONU demands received via REPORT messages.

The DBA-generated static and dynamic grants for the ONUs are scheduled in the beginning of the cycle, in which all the static grants for the ONUs are scheduled at the beginning of the cycle, and then the dynamic grants are scheduled. The static grants ensure a periodic, almost constant bandwidth, low jitter transmission channel for every ONU in each cycle. Advantageously, ONU schedulers may make use of this splitting of their transmission grant windows—in several ways—to provide low delay and low jitter services. For example, an ONU may schedule high-priority, real-time traffic requiring low jitter in its static grant window, and any remaining traffic in its dynamic grant window(s).

In a preferred embodiment of our OLT chip(s), this feature for separation of static and dynamic grant windows may be enabled or disabled—as desired—by a user. By default, we enable this feature (non-aggregate grant mode). If disabled, (aggregate grant mode), the static and dynamic grants generated by a DBA for each ONU are merged together and scheduled as a single ONU grant window in every cycle.

Figure 7:
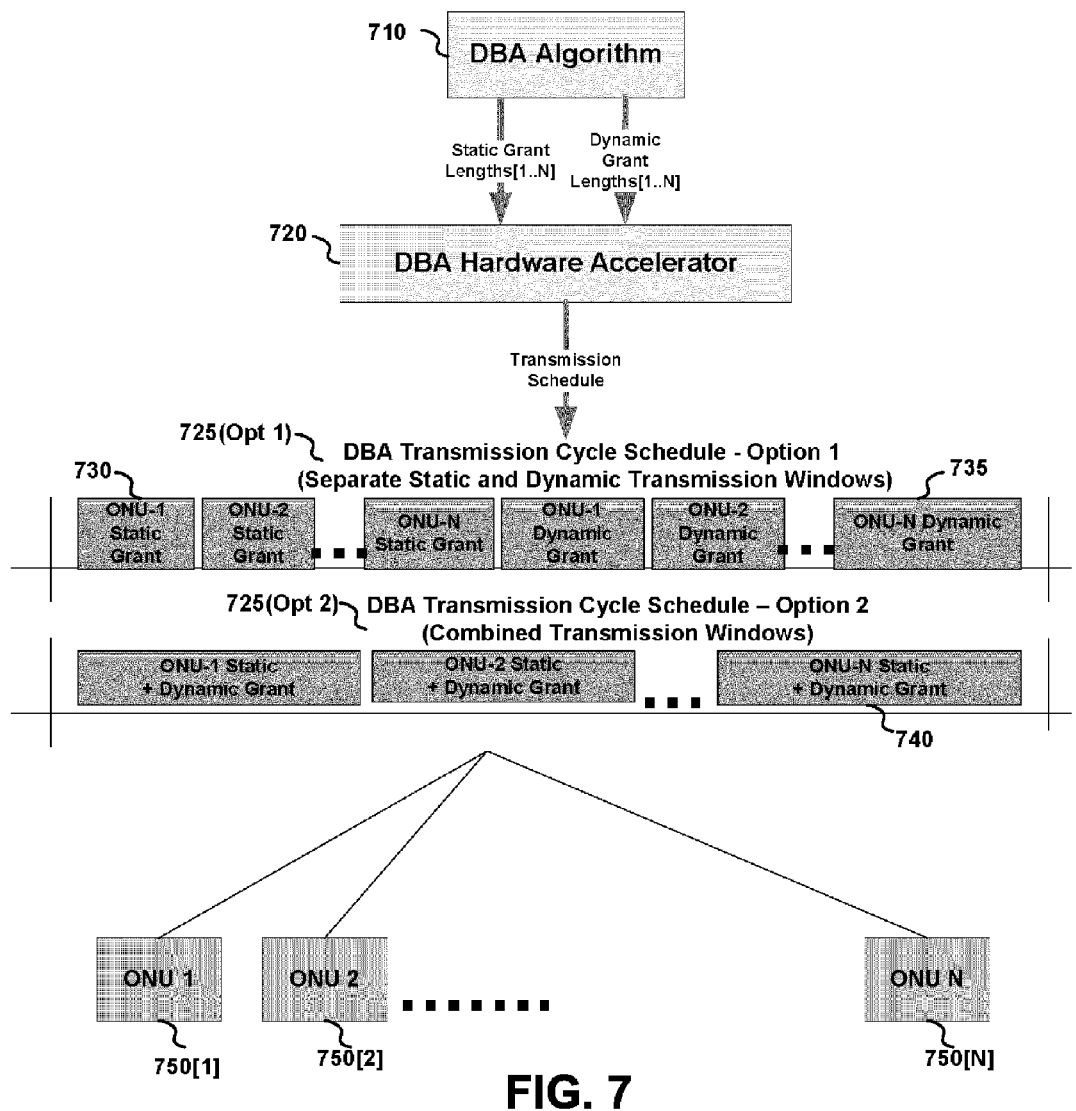
FIG. 7 is a block diagram depicting the static and dynamic grant windows according to the present invention.

With reference now to FIG. 7, there is shown a block diagram depicting static and dynamic grant windows 700. In particular, shown in that block diagram is our inventive DBA algorithm 710, in conjunction with our DBA hardware accelerator 720 producing a transmission schedule 725 for each of the respective ONUs 750[1] ... 750[N]. As can be seen from that FIG. 7, with option 1 the DBA transmission cycle schedule has separate static 730 and dynamic transmission windows 735. With option 2, the DBA transmission cycle schedule produces combined transmission windows 740.

Work-Conservation Options

Our inventive DBA algorithm is flexible enough to accommodate both a work-conserving mode of operation and a non-work-conserving mode—based upon a user-configurable DBA parameter. The DBA operation described previously was work-conserving, which is generally a default mode of operation. In this work-conserving mode, the bandwidth allocated to an ONU is not upper-bounded by its maximum-SLA bandwidth value. Instead, as long as sufficient bandwidth is available in a cycle and there are no other contending ONUs, an ONU may receive as much bandwidth as its demand.

In contrast to the default work-conserving mode, in non-work-conserving mode, our DBA algorithm enforces an upper-bound on the bandwidth allocated to an ONU in every cycle, according to its maximum-SLA bandwidth value. Accordingly, no ONU will ever receive more than its maximum-SLA bandwidth rates, even if there is unused transmission bandwidth available in a particular cycle. As mentioned before, it is occasionally desirable to implement a non-work-conservation mode, as it produces reduced receive buffer sizes and congestion and enables tighter jitter bounds—at the expense of lower bandwidth utilization. Our preferred implementation permits an operator to select/configure either mode of operation as needed/desired.

Internally, to support this non-work-conserving mode of operation, our DBA algorithm caps the demand values specified in ONU REPORT messages (which—as you recall—are used as input parameters to the DBA algorithm) at their maximum SLA-bandwidth value(s) before performing bandwidth allocation.

Additionally, our DBA algorithm has yet another non-work conserving mode of operation named CBR-mode. This CBR mode is used (in conjunction with static and dynamic grant separation) to provide TDM-like (Time Division Multiplexing) allocation of the minimum SLA bandwidths to ONUs in each cycle—to support traffic with extremely low jitter and burstiness requirements, such as Constant Bit Rate (CBR) traffic. This is however; obtained at a cost, namely lower bandwidth utilization.

When an EPON employs a CBR-mode, each registered ONU receives a static grant equal to its minimum SLA bandwidth in each cycle—even if it's reported demand for this cycle is less than this minimum bandwidth. After allocating fixed static-grants to each ONU, any remaining bandwidth is then shared between ONUs based on their demands and SLA-parameters—thereby comprising dynamic grants. ONUs will then use their periodic, fixed-length static-grant window assignment to send CBR traffic—up to their minimum-SLA bandwidths—while using their dynamic-grants for other traffic.

Operationally—to support this CBR-mode—our inventive DBA algorithm sets lower-bounds for the demand values specified in ONU REPORT messages (which, as we recall, are used as input parameters to the DBA algorithm) to their minimum SLA-bandwidth value(s) before performing bandwidth allocation.

DBA Iteration Bound

As can be readily appreciated, since our DBA module is required to in real-time in each cycle, and must guarantee completion of bandwidth allocation among—up to 64 ONUs within the configured cycle time—the DBA algorithm's time complexity is of critical importance. As noted before, an important component of our DBA algorithm is an iterative procedure for max-min fair bandwidth allocation.

Theoretically, such a max-min fair process requires a number of iterations (for example, N) in a worst case, where N is the number of ONUs contending for DBA grants. However, to guarantee enhanced scalability and speed of operation, our inventive DBA algorithm performs an approximation that limits the number of iterations in a DBA cycle to less than $\log_2 N$ iterations (or five (5) iterations when the total number of ONUs comprising the PON is 64), irrespective of the number of ONUs contending for bandwidth in that cycle.

This iteration limit (five iterations), which we have determined through extensive simulation and analysis, introduces only very minor variations from optimal fairness, while producing much faster running times and a simpler implementation. Of further advantage, our inventive iteration limit allows our DBA implementation to support small DBA cycles of up to 1 ms, which can provide low delay and jitter services to customer traffic.

To validate the efficiency of our inventive, cycle limiting implementation, we performed simulations on systems comprising 64 active ONUs and a 2 ms DBA cycle, and plotted the algorithm's accuracy for those cases when the maximum number of iterations is varied from two (2) to six (6). The accuracy comparison is performed by comparing the grant allocation using these iteration limits, against the ideal case where the iteration limit is 64.

For each iteration limit, we simulated 200 different DBA cycle executions comprising randomly generated demand and SLA patterns for each ONU, and then perform DBA bandwidth allocations for each execution scenario. We then measure the percentage of DBA cycles for which an error in bandwidth allocation to at least one ONU is observed, and for each such cycle, we measure the worst-case error in bandwidth allocation observed by an individual ONU (due to the iteration limit/bound).

Figure 8:
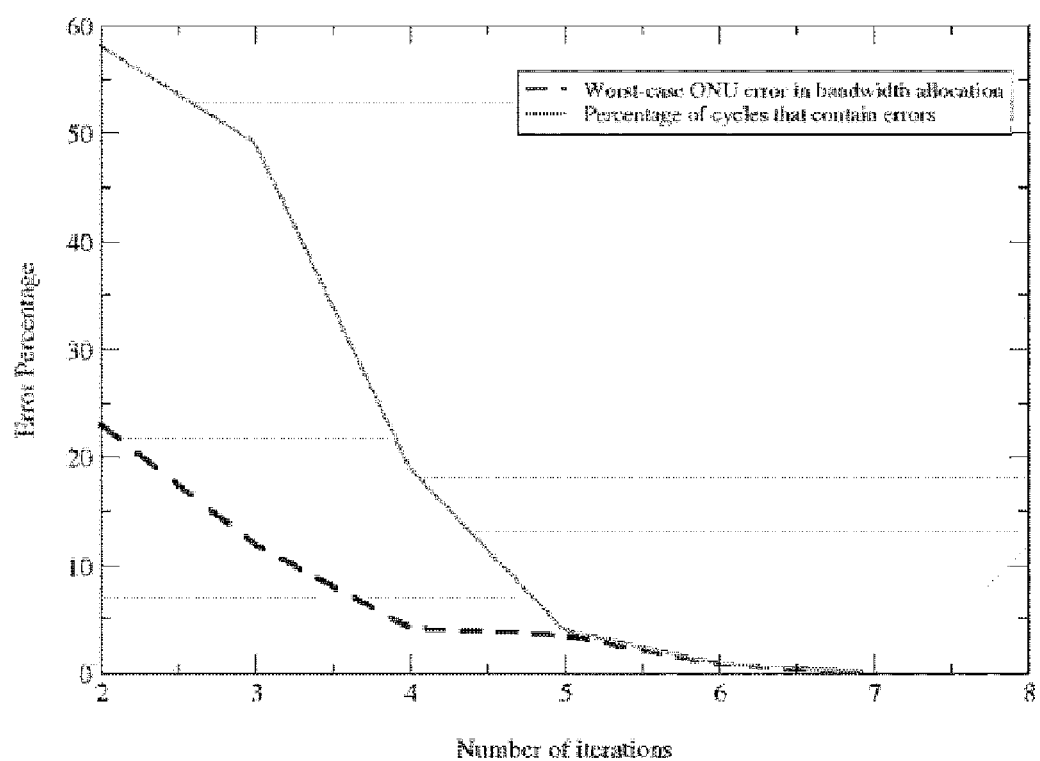
FIG. 8 is a graph depicting the tradeoff between DBA accuracy and number of max-min iterations according to the present invention.

With reference now to FIG. 8, there is shown a graph depicting the tradeoff between DBA accuracy and number of max-min iterations. In particular, and as our results indicate, for most practical EPON scenarios, limiting the maximum number of iterations to a reasonable fixed value (such as 5) from a possible 64 (for a system of 64 ONUs), does not cause any substantial differences to our algorithm's max-min fairness accuracy. More particularly, limiting the maximum number of iterations to five (5) iterations causes only very minor error (<4%) in less than 5% of typical configurations.

While not specifically shown in this FIG. 8, it appears that execution scenarios that do exhibit the very minor error are mostly those situations where the average demand in a DBA cycle is close to the total available upstream bandwidth for that particular DBA cycle. For those scenarios where the ONU demand in the cycle is much less than or much greater than the available upstream bandwidth, constraining the DBA to run for a limited number of iterations does not typically introduce any errors. A plausible explanation for this observation is that the max-min fair allocation rates are reached within a very few number of iterations, hence limiting the number of iterations within the DBA algorithm for such situations, advantageously does not affect the accuracy of our algorithm.

Figure 9:
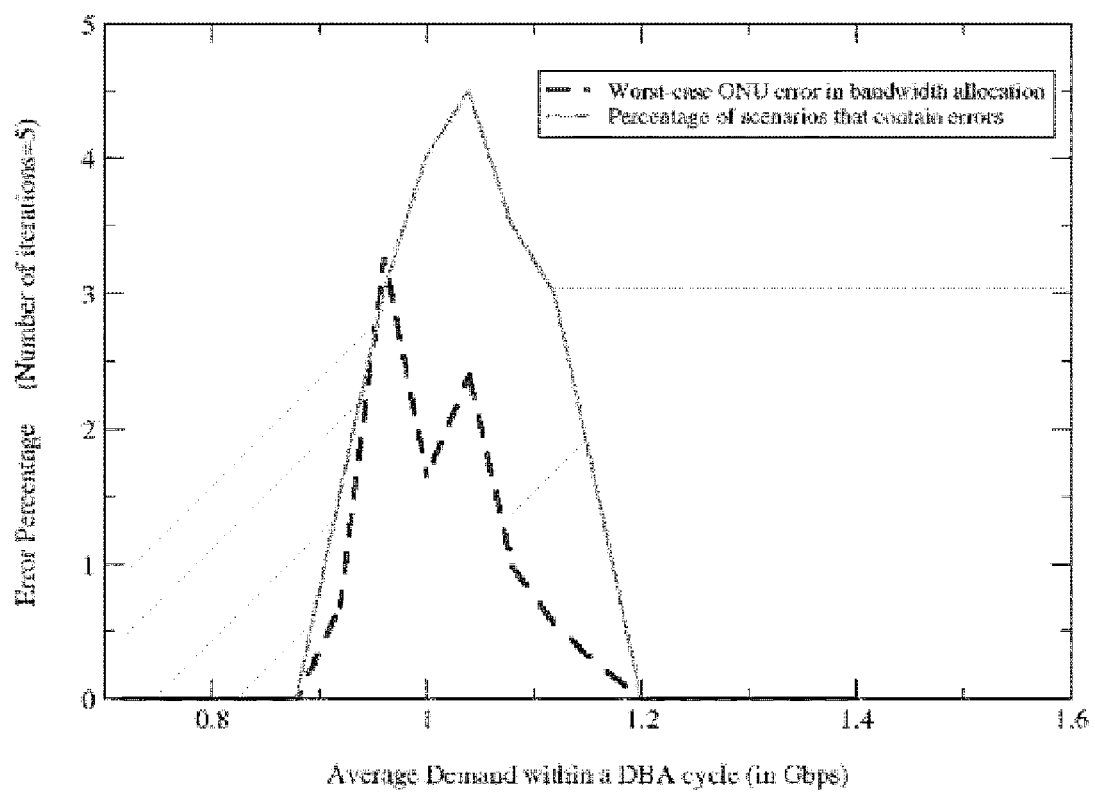
FIG. 9 is a graph depicting the variation in DBA accuracy as a function of ONU demand(s)

With reference now to FIG. 9, there is shown a graph depicting variation in DBA accuracy as a function of ONU demand(s). More particularly, when an iteration limit for the DBA algorithm is set to five (5), we may observe that the variation in the percentage of cycles with errors, and the worst-case ONU allocation error, with increasing input load (the sum of all ONU demand(s)). Accordingly, we varied the DBA cycle load from 70% to 140% of the available upstream EPON bandwidth and observed the cases that exhibited deviations from ideal allocation results—those corresponding to DBA iteration limit of 64.

Accordingly, and as we now inventively teach, we fix the maximum number of iterations in our DBA implementation(s) to five (5). Advantageously, this limit allows us to reduce the DBA algorithm's complexity, its execution time, and further enables our DBA module to run at maximum speed, without affecting—for all practical purposes—the accuracy of the algorithm's fair bandwidth allocation policy.

DBA Simulation Results

With this theoretical and operational discussion of our inventive algorithms and structures in place, we may now present some simulation results such that they provide practical insight into the operation of our DBA algorithm. As will be readily appreciated, our simulation results highlight the upstream EPON bandwidth allocated by our DBA algorithm to a varying number of ONUs having different SLA parameters and input rates. For each of these following simulations, results for all three work-conservation mode (work-conserving mode, non-work-conserving mode, and CBR mode) are shown. In addition, the cycle-time is fixed to be 2 ms and the number of iterations within our DBA algorithm for max-min fairness determination is preferably fixed to five (5) iterations, as mentioned previously and we now teach. Bandwidth overhead for DISCOVERY/REGISTER-ACK messages within a particular cycle is not considered in the simulations, so the entire 1 Gbps upstream EPON bandwidth is used by our DBA for allocating transmission grants among the various ONUs comprising the simulation(s).

What follows is a consideration of several different scenarios. In each, the number of ONUs, their SLAs and their bandwidth demands for a cycle are specified, and the DBA bandwidth allocation to each ONU for the cycle is plotted, for all three DBA modes. The bandwidth grants plotted in the graphs correspond to the sum of the static and dynamic grant lengths assigned by the DBA.

Scenario 1—4 ONUs With Identical SLAs

In this Scenario, we consider four (4) ONUs (1, 2, 3, and 4) each having substantially the same SLA namely, {Minimum Bandwidth=50 Mbps; Maximum Bandwidth=300 Mbps; Weight=1}. We consider three different cases for the ONU demand distribution, as reported in the REPORT message of the previous cycle. For each of the following CASES, we have plotted in their respective FIG, the DBA grant allocation for each of the ONUs, for three different DBA modes, namely: 1) Work-Conserving Mode; 2) Non-Work-Conserving Mode; and 3) CBR Mode. Finally, for convenience, we have plotted the DBA grants in units of Mbps by converting the actual grant values in units of 16 ns time-quanta into total bits and dividing by the cycle time.

Figure 10:
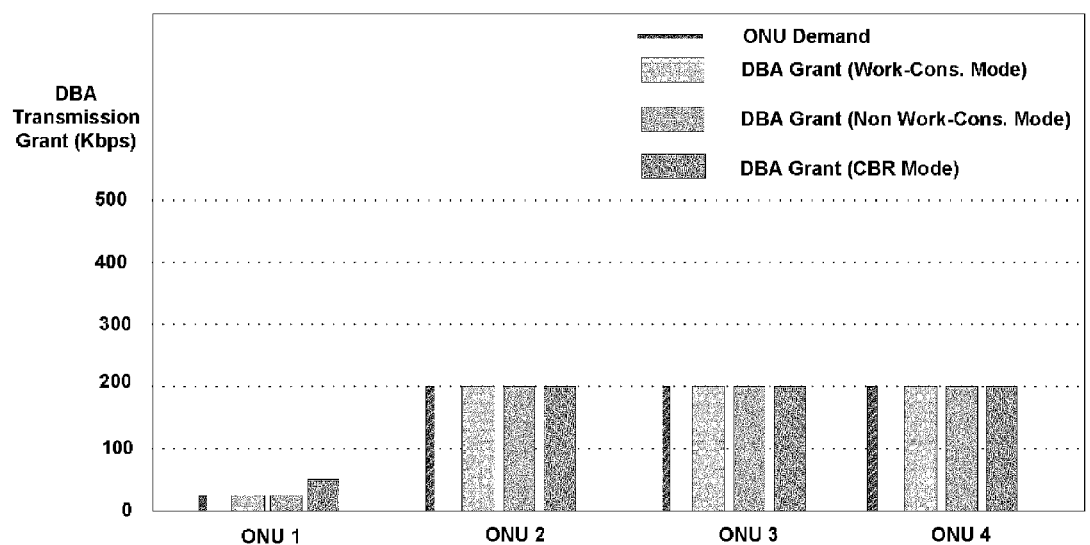
FIG. 10 is a graph depicting the results for simulation scenario #1—CASE 1, in which ONU 1 has a demand of 25 Mbps, ONUs 2, 3, and 4 have demands of 200 Mbps, according to the present invention.

With reference now to FIG. 10, there is shown a graph depicting the results for Scenario #1—CASE 1, in which ONU 1 has a demand of 25 Mbps, ONUs 2, 3, and 4 have demands of 200 Mbps. In this CASE, since the total demand of all of the ONUs is less than the available bandwidth, the grants assigned to an ONU is simply equal to its respective demand, for the work-conserving and non-work conserving mode(s). For the CBR mode, the grant assigned to ONU 1 is its 50 Mbps Minimum SLA bandwidth, even though it's actual demand is less than that amount.

Figure 11:
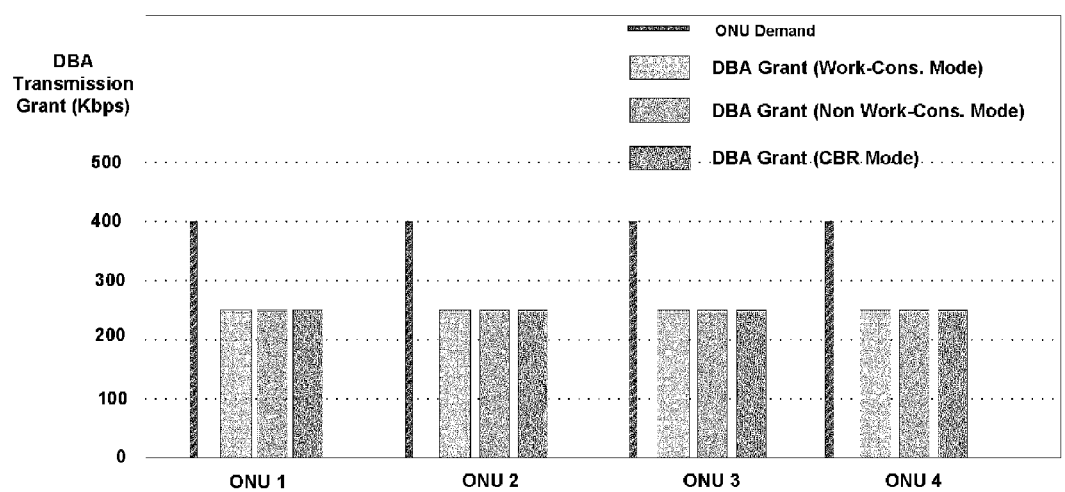
FIG. 11 is a graph depicting the results for simulation scenario #1—CASE 2, in which all ONUs have a demand of 400 Mbps according to the present invention.

In FIG. 11, a graph depicting the results for Scenario #1—CASE 2, in which all of the ONUs have a demand of 400 Mbps. As can be observed from this FIG. 11, since the demand of each ONU is greater than the max-min fair rate of 250 Mbps, all ONUs receive grants equal to this fair rate of 250 Mbps.

Figure 12:
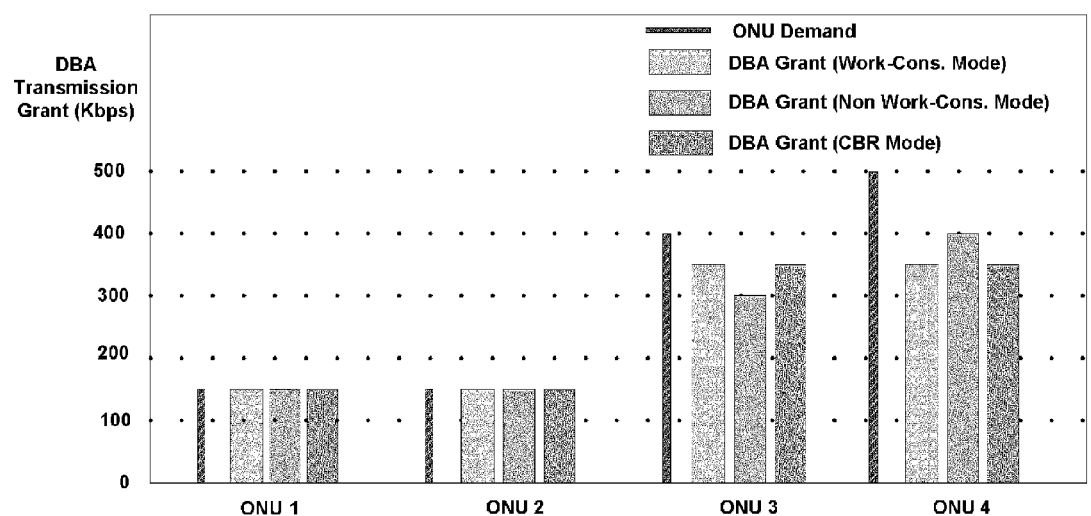
FIG. 12 is a graph depicting the results for simulation scenario #1—CASE 3, in which ONU 1 and ONU 2 each have a demand of 150 Mbps, ONU 3 has a demand of 400 Mbps and ONU 4 has a demand of 500 Mbps according to the present invention.

Finally with respect to this Scenario 1, the results for CASE 3 are shown in FIG. 12. In this CASE 3, ONU 1 and ONU 2 each have a demand of 150 Mpbs, ONU 3 has a demand of 400 Mbps and ONU 4 has a demand of 500 Mbps. Since ONU 1 and ONU 2 have demands less than those of ONU 3 and ONU 4, these two ONUs (1 and 2) each receive grants equal their complete demand—per max-min fairness rules—while ONU 3 and ONU 4 share the remainder of the bandwidth equally. Consequently, ONU 3 and ONU 4 each receives grants of 350 Mbps. For the non-work conserving mode, the demands of ONU 3 and ONU 4 are capped to an amount equal to their Maximum SLA Bandwidth of 300 Mbps, thereby limiting their DBA grant values.

Scenario 2—8 ONUs With Different SLAs

In this Scenario, we consider eight (8) ONUs (1, 2, 3, 4, 5, 6, 7 and 8). ONUs 1 though 5 have substantially the same SLA namely, {Minimum Bandwidth=20 Mbps; Maximum Bandwidth=100 Mbps; Weight=1}; ONUs 6 and 7 have substantially the same SLA as each other—while different from ONUs 1-5—namely, {Minimum Bandwidth=40 Mbps; Maximum Bandwidth=200 Mbps; Weight=2}; and ONU 8 has yet a different SLA from all the other ONUs namely, {Minimum Bandwidth=60 Mbps; Maximum Bandwidth=300 Mbps; Weight=3}.

As before with Scenario 1, we consider in this Scenario 2 three different cases for the ONU demand distribution, as reported in the REPORT message of the previous cycle. For each of the following CASES, we have plotted in their respective FIG, the DBA grant allocation for each of the ONUs, for three different DBA modes, namely: 1) Work-Conserving Mode; 2) Non-Work-Conserving Mode; and 3) CBR Mode. Again, for convenience, we have plotted the DBA grants in units of Mbps by converting the actual grant values in units of 16 ns time-quanta into total bits and dividing by the cycle time.

Figure 13:
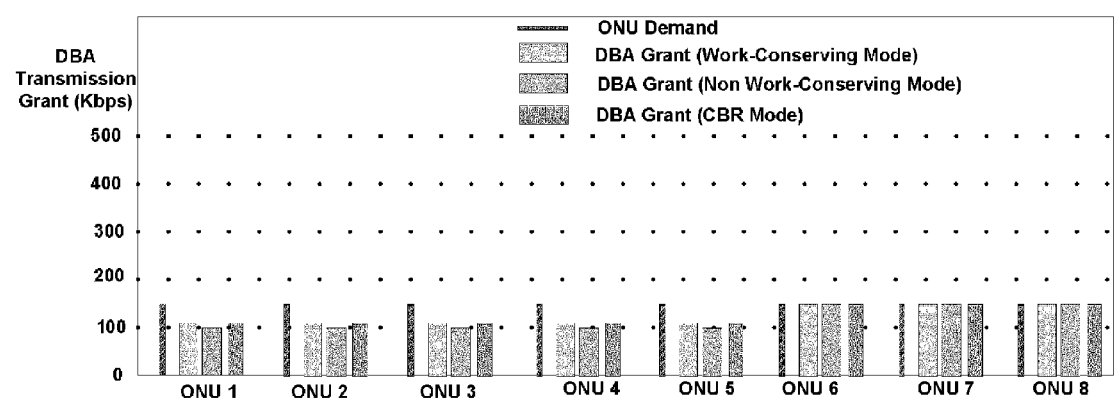
FIG. 13 is a graph depicting the results for simulation scenario #2—CASE 1, in which all ONUs have a demand of 150 Mbps according to the present invention.

With reference now to FIG. 13, there is shown a graph depicting the results for Scenario #2—CASE 1, in which all of the ONUs (1-8) each has a demand of 150 Mbps. In this CASE, once all of the ONUs receive their Minimum SLA bandwidth share, the remaining bandwidth is divided according to weighted max-min fair rules among the eight (8) ONUs. Since ONUs 6, 7, and 8 have greater weights than ONUs 1 through 5, ONUs 6 through 8 receive as much grant as demanded, while the remaining ONUs 1 through 5 share the excess bandwidth among themselves thereby receiving 110 Mbps grants each. In the Non-Work-Conserving mode of operation, the demands of ONUs 1 through 5 are limited to their Maximum SLA bandwidth level of 100 Mbps, so they can receive grants up to that limit of 100 Mbps.

Figure 14:
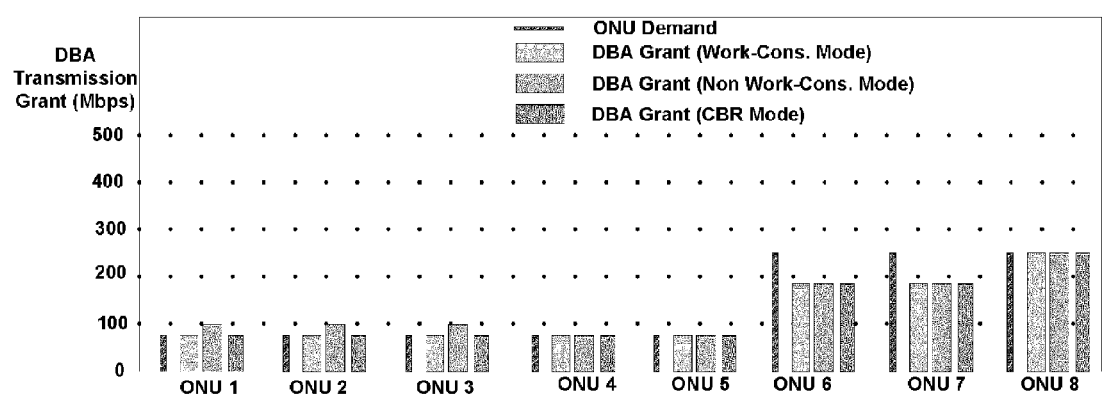
FIG. 14 is a graph depicting the results for simulation scenario #2—CASE 2, in which ONUs 1 through 5 each have a demand of 75 Mbps while ONUs 6 through 8 each have a demand of 250 Mbps according to the present invention.

Turning now to FIG. 14, Scenario #2—CASE 2 is shown in which ONUs 1 through 5 each has a demand of 75 Mbps while ONUs 6-8 have a demand of 250 Mbps. In this CASE, after all ONUs receive their Minimum SLA bandwidth share, the remaining bandwidth is divided according to weighted max-min fair rules among the eight (1-8) ONUs. The 75 Mbps demand of ONUs 1 through 5 and the 250 Mbps demand of ONU 8 turns out to be less than their max-min fair share, therefore these ONUs receive grant amounts equal to their demand(s). The remaining bandwidth is shared between ONUs 6 and 7 so they receive grants of 187.5 Mbps.

Figure 15:
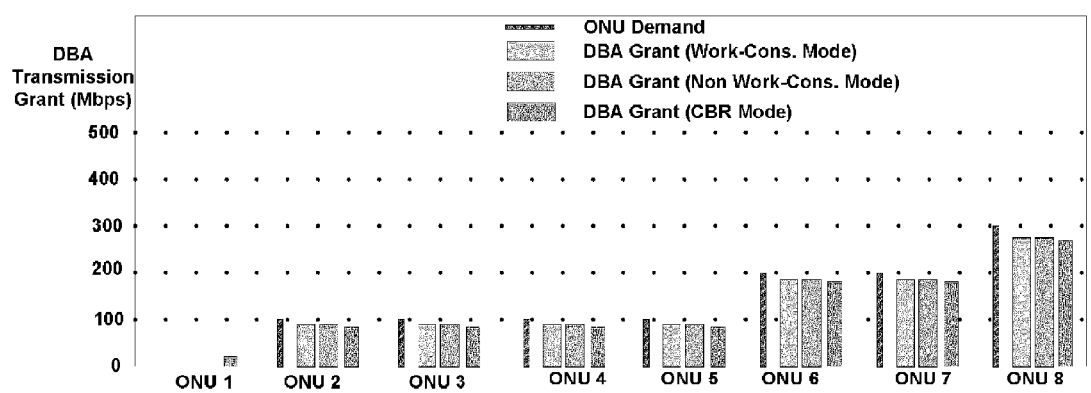
FIG. 15 is a graph depicting the results for simulation scenario #2—CASE 3, in which ONU 1 has zero (0) demand, ONUs 2 through 5 each have a demand of 100 Mbps, ONU 6 and 7 each have a demand of 200 Mbps and ONU 8 has a demand of 300 Mbps according to the present invention.

Finally, Scenario #2—CASE 3 results are shown graphically in FIG. 15. In particular—for that CASE 3—ONU 1 has zero (0) demand, ONUs 2 through 5 each has a demand of 100 Mbps, ONUs 6 and 7 have demands of 200 mbps and ONU 8 has a demand of 300 Mbps.

Accordingly, since ONU 1 has zero (0) demand, it is not considered for grant allocation in the work-conserving and non-work-conserving DBA modes. After minimum SLA grant allocations are performed, the max-min fair rate corresponding to the excess bandwidth turns out to be greater than all of the remaining demands. Consequently, each ONU receives excess bandwidth substantially proportional to its weight. This results in grants of 91 Mbps for ONUs 2 through 5; grants of 182 Mbps for ONUs 6 and 7; and a grant of 273 Mbps for ONU 8.

In the CBR mode, the DBA allocates minimum SLA bandwidth of 20 Mbps to ONU 0, even though it has zero demand for this DBA cycle. Consequently, the remaining grant lengths decrease in value down to 89 Mbps for ONU 2 through 7; 178 Mbps for ONUs 6 and 7; and down to 267 Mbps for ONU 8.

Finally, FIGS. 16(a), (b), and (c) depict a representative pseudocode of our inventive method(s) and algorithms. Importantly, this pseudocode is only representative of an implementation of our inventive methods and teachings, and one skilled in the art could certainly implement our teachings within various software systems and/or programming languages of choice, or implement same within various levels of hardware.

As can now be readily appreciated by those skilled in the art, our inventive software and hardware provide significant improvements over the prior art in managing/providing upstream bandwidth in EPONs. And while we have provided certain preferred embodiments our invention is not so limited. Instead, it is to be limited only by the following claims.

What is claimed is:

1. An Optical Line Terminator (OLT) apparatus for use in an Ethernet Passive Optical Network (EPON) having at least one OLT in optical communication with one or more Optical Network Units (ONUs), said OLT apparatus comprising:

a Dynamic Bandwidth Allocation (DBA) module, for generating a transmission grant schedule for each of the ONUs through the use of a DBA algorithm, said DBA module operationally comprising:

a hardware Dynamic Bandwidth Allocation (DBA) module, including a simplified DBA algorithm implemented within an Applications Specific Integrated Circuit (ASIC); or a software DBA module, including a comprehensive DBA algorithm implemented within a set of software executing on a microprocessor;

a DBA hardware accelerator, in communication with the DBA module, said DBA hardware accelerator including:

a REPORT table containing ONU queue length information conveyed in recent REPORT messages received from the ONUs;

a GRANT table containing grant start times and grant lengths for the ONUs for a next cycle;

an MPCP module, for providing communications between the OLT and the ONUs via MultiPont-to-Point control protocol; and an EPON port, for providing communication between the MPCP module and the ONUs;

wherein either the hardware DBA module or the software DBA module within the DBA module are made operational as selected and/or configured by a user, and the OLT utilizes the selected and/or configured DBA module to generate a GRANT table indicative of EPON upstream bandwidth allocation for the ONUs for each cycle of operation in response to REPORT messages received by the OLT from the ONUs for a previous cycle.

2. The apparatus according to claim 1 further comprising a plurality of OLTs, each of said plurality of OLTs sharing a single, common DBA module.

3. The apparatus according to claim 2 further comprising:
means for determining a weight value for each of the ONUs for use in the max-min fairness strategy.

4. The apparatus according to claim 2 further comprising means for determining a weight value determination for an ONU made according to one of the following methodologies consisting of: 1) weight value is a function of the ONUs Service Level Agreement parameters; 2) weight value is proportional to the ONUs minimum Service Level Agreement bandwidth; 3) weight value is proportional to the ONUs average Service Level Agreement bandwidth; 4) weight value is a function of the ONUs past requested bandwidth(s); 5) weight value for the ONU is inversely proportional to the amount of upstream traffic recently generated by the ONU.

5. The apparatus according to claim 1 wherein said apparatus comprises a highly-integrated circuit embodied within a single chip.

6. The apparatus according to claim 1 wherein said DBA algorithm employs a max-mm fairness strategy.

7. The apparatus according to claim 6 wherein said max-min fairness strategy is iteratively performed and iterates "N" times, where N is a number less than the number of ONUs comprising the PON.

8. The apparatus according to claim 6 wherein N is $\log_2 M$ iterations, where M is the number of ONUs comprising the PON.

9. The apparatus according to claim 1 further comprising:
means for determining, a static grant length for each ONU comprising the PON; and
means for iteratively determining, a dynamic grant length for each ONU comprising the PON.

10. The apparatus according to claim 9, wherein said dynamic grant length determining means iterates "N" times, where N is a number less than the number of ONUs comprising the PON.

11. The apparatus according to claim 10 wherein N is $<=\log_2 M$ iterations, where M is the number of ONUs comprising the PON.

12. The apparatus according to claim 1 wherein said apparatus operates in a configurable mode, said mode being one selected from the group consisting of: Work-Conserving Mode, Non-Work-Conserving Mode, and Constant-Bit-Rate Mode (CBR).

* * * * *